United States Patent
Briand

(10) Patent No.: US 9,321,539 B2
(45) Date of Patent: Apr. 26, 2016

(54) AVIATION FUEL TANK WITH RIGID WALL FOR CRASH ENERGY ABSORPTION

(71) Applicant: Zodiac Aerosafety Systems, Plaisir (FR)

(72) Inventor: Valérie Briand, Saint-Ouen-du-Tilleul (FR)

(73) Assignee: Zodiac Aerosafety Systems, Plasir (FR)

( * ) Notice: Subject to any disclaimer, the term of this patent is extended or adjusted under 35 U.S.C. 154(b) by 0 days.

(21) Appl. No.: 14/668,701

(22) Filed: Mar. 25, 2015

(65) Prior Publication Data

US 2015/0274311 A1    Oct. 1, 2015

Related U.S. Application Data

(60) Provisional application No. 61/969,967, filed on Mar. 25, 2014.

(51) Int. Cl.
| | |
|---|---|
| *B64D 37/32* | (2006.01) |
| *B64D 37/06* | (2006.01) |
| *B32B 27/12* | (2006.01) |
| *B32B 5/02* | (2006.01) |
| *B32B 27/06* | (2006.01) |
| *B32B 1/02* | (2006.01) |
| *D03D 15/00* | (2006.01) |

(52) U.S. Cl.
CPC . *B64D 37/32* (2013.01); *B32B 1/02* (2013.01); *B32B 5/024* (2013.01); *B32B 27/065* (2013.01); *B32B 27/12* (2013.01); *B64D 37/06* (2013.01); *B32B 2250/40* (2013.01); *B32B 2262/0269* (2013.01); *B32B 2262/0276* (2013.01); *B32B 2262/101* (2013.01); *B32B 2262/106* (2013.01); *B32B 2307/558* (2013.01); *B32B 2307/702* (2013.01); *B32B 2605/00* (2013.01); *D03D 15/00* (2013.01)

(58) Field of Classification Search
CPC ...... B32B 27/12; B32B 5/024; B32B 27/065; B32B 1/02; B32B 2250/40; B32B 2262/0269; B32B 2262/0276; B32B 2262/101; B32B 2262/106; B32B 2307/558; B32B 2307/702; B32B 2605/00; B64D 37/32; B64D 37/06; D03D 15/00

See application file for complete search history.

(56) References Cited

U.S. PATENT DOCUMENTS

| | | | |
|---|---|---|---|
| 4,511,105 A | 4/1985 | Morrisey | |
| 5,674,586 A | 10/1997 | Toni et al. | |

FOREIGN PATENT DOCUMENTS

| | | |
|---|---|---|
| EP | 2415693 A1 | 2/2012 |
| FR | 2763313 A1 | 11/1998 |
| WO | 2014/011293 A2 | 1/2014 |

OTHER PUBLICATIONS

International Patent Application No. PCT/IB2015/052210, Invitation to Pay Additional Fees and, Where Applicable, Protest Fee dated Jun. 19, 2015.
International Patent Application No. PCT/IB2015/052210, International Search Report and Written Opinion dated Aug. 24, 2015.

*Primary Examiner* — Michael C Miggins
(74) *Attorney, Agent, or Firm* — Kilpatrick Townsend & Stockton LLP; Dean W. Russell; Eben D. Allen

(57) ABSTRACT

Embodiments of the present invention relate generally to fuel tanks for aviation, and particularly to construction of rigid tank walls that have been found useful in absorbing energy of a magnitude expected during a crash. In some aspects, the rigid tank wall construction includes particular materials, such as a thermoplastic resin matrix. In some aspects, the rigid tank wall construction includes a particular arrangement of reinforcing fibers, such as a twill weave pattern.

31 Claims, 6 Drawing Sheets

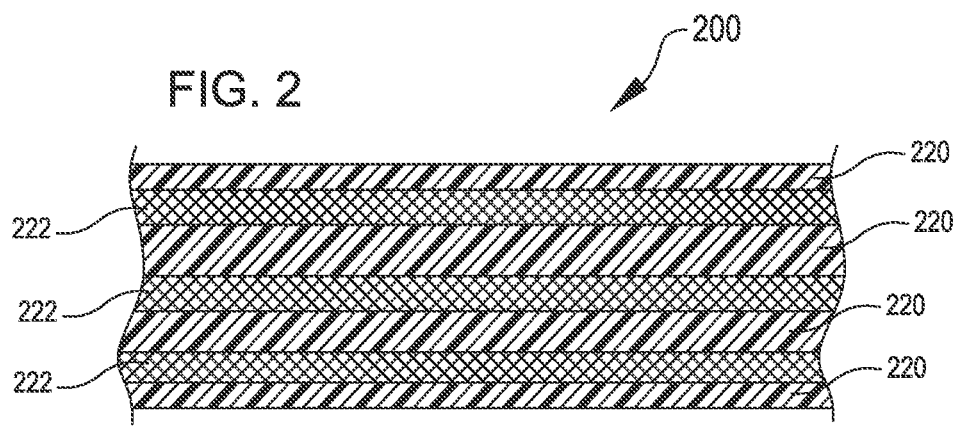
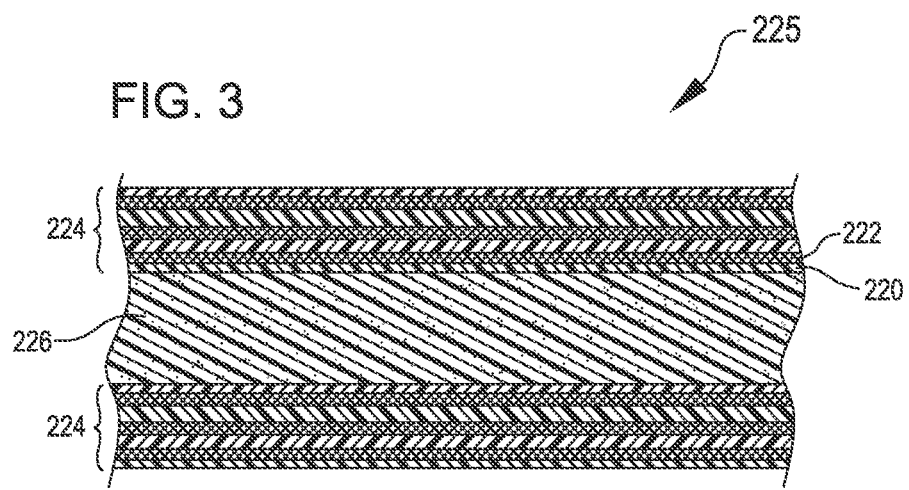

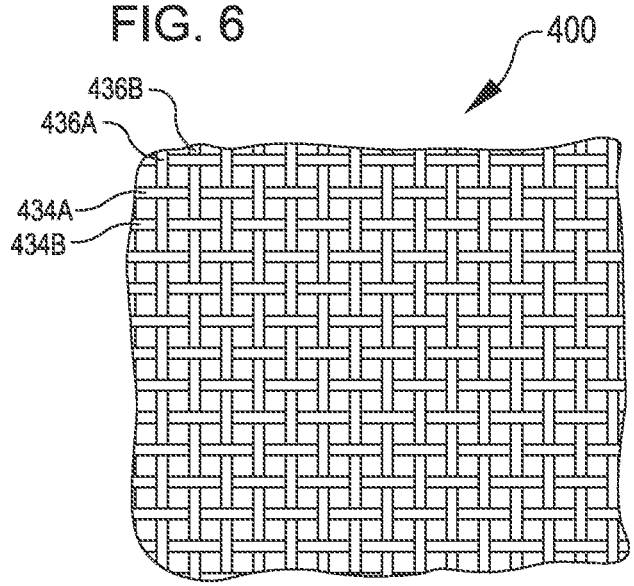
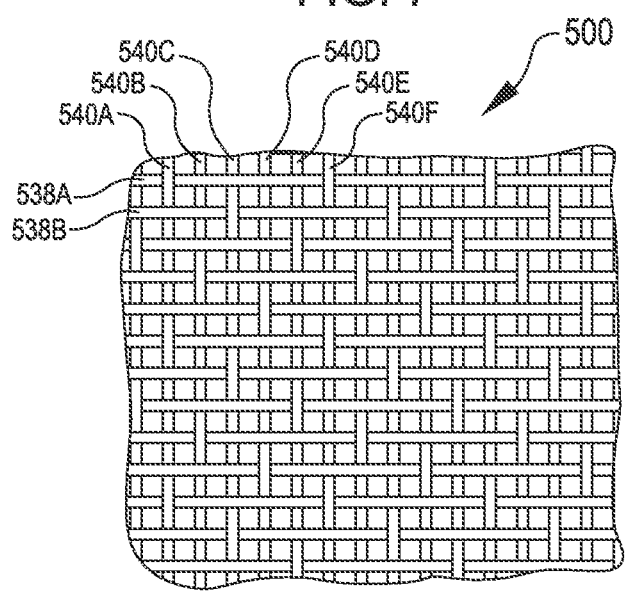

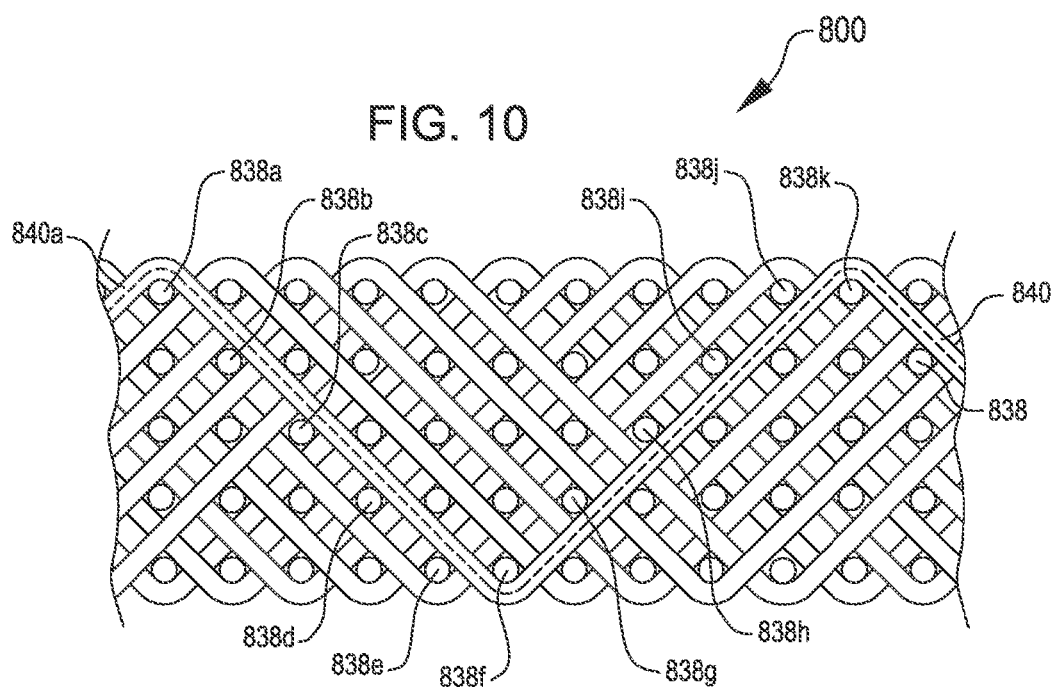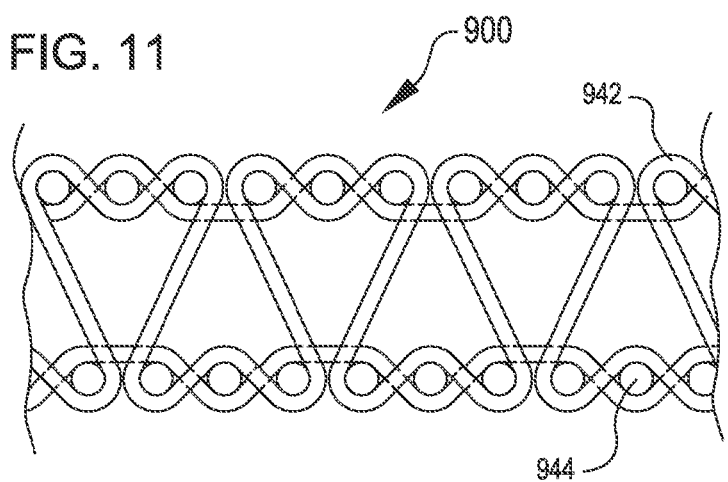

… (US 9,321,539 B2)

AVIATION FUEL TANK WITH RIGID WALL FOR CRASH ENERGY ABSORPTION

CROSS REFERENCE TO RELATED APPLICATIONS

This application claims the benefit of U.S. Provisional Application Ser. No. 61/969,967, filed Mar. 25, 2014, titled "RIGID TANK WALL WITH BETTER CRASH ENERGY ABSORPTION FOR AVIATION," the entire contents of which are hereby incorporated by reference.

FIELD OF THE INVENTION

Embodiments of the present invention relate generally to fuel tanks for aviation, and particularly to construction of rigid tank walls that have been found useful in absorbing energy of a magnitude expected during a crash.

BACKGROUND

Certain government standards exist for regulating fuel tanks for use in various vehicles, such as armored vehicles, tanks, and race cars; aircraft such as helicopters, commercial and private aircraft, tactile missiles, and other aerospace vehicles; marine craft; and other vehicles. Fuel tanks must be able to withstand certain crash parameters, such that they limit rupturing of the tank and the consequent dangers associated therewith. Accordingly, fuel tanks for use in the aviation field, particularly for crash worthy helicopters applications, are often made of two pieces: a rigid outer tank and a flexible inner tank.

The rigid outer tank generally provides a constant, predictable shape that facilitates attachment of the fuel tank to other components of the aircraft, such as for installation of the tank into the fuselage, wings, bays, or other available space of the aircraft. For example, some known rigid outer tanks are made of a composite material featuring a fiber-reinforced epoxy or other thermosetting resin. While thermosetting composite materials are generally considered to provide favorable characteristics for the rigid tank, they often have limited elongation before breaking (e.g., usually less than 10% elongation) and do not absorb a sufficient amount of energy without other components to meet government crash standards.

Accordingly, the flexible inner tank is typically installed inside the rigid tank to make the overall tank assembly more crash resistant. For example, the flexible inner tank is often made with a rubber reinforced with polyamide fabric (or polyester fabric) or some other construction that will distort to absorb energy in the event of a crash. In some cases, the thickness of the flexible inner tank is increased to provide greater crash resistance. However, the addition of the flexible inner tank (or the addition of material thereto to attain a greater thickness) adds weight to the system, which is undesirable in many instances.

BRIEF SUMMARY

Embodiments of the invention described herein thus provide rigid tank wall constructions for aviation fuel tanks. Various of the disclosed rigid tank wall constructions are believed to exhibit sufficiently improved energy absorption for crash resistance that an inner tank can be reduced in thickness or eliminated altogether, thus yielding significant weight savings for an overall aviation fuel tank assembly. In some aspects, the rigid tank wall construction includes particular materials, such as a thermoplastic resin matrix. In some aspects, the rigid tank wall construction includes a particular arrangement of reinforcing fibers, such as a twill weave pattern.

The foregoing presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later. For a fuller understanding of the nature and advantages of the present invention, reference should be made to the ensuing detailed description and accompanying drawings.

BRIEF DESCRIPTION OF THE DRAWINGS

FIG. 2 illustrates a side cross-sectional view of a monolithic structure for use in an aviation fuel tank assembly according to certain embodiments.

FIG. 3 illustrates a side cross-sectional view of a sandwich structure for use in an aviation fuel tank assembly according to certain embodiments.

FIG. 6 illustrates an example of a plain weave fabric that may be used in an aviation fuel tank assembly according to certain embodiments.

FIG. 7 illustrates an example of a satin weave fabric that may be used in an aviation fuel tank assembly according to certain embodiments.

FIG. 10 illustrates another example of an interlock fabric that may be used in an aviation fuel tank assembly according to certain embodiments.

FIG. 11 illustrates an example of a velvet fabric that may be used in an aviation fuel tank assembly according to certain embodiments.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
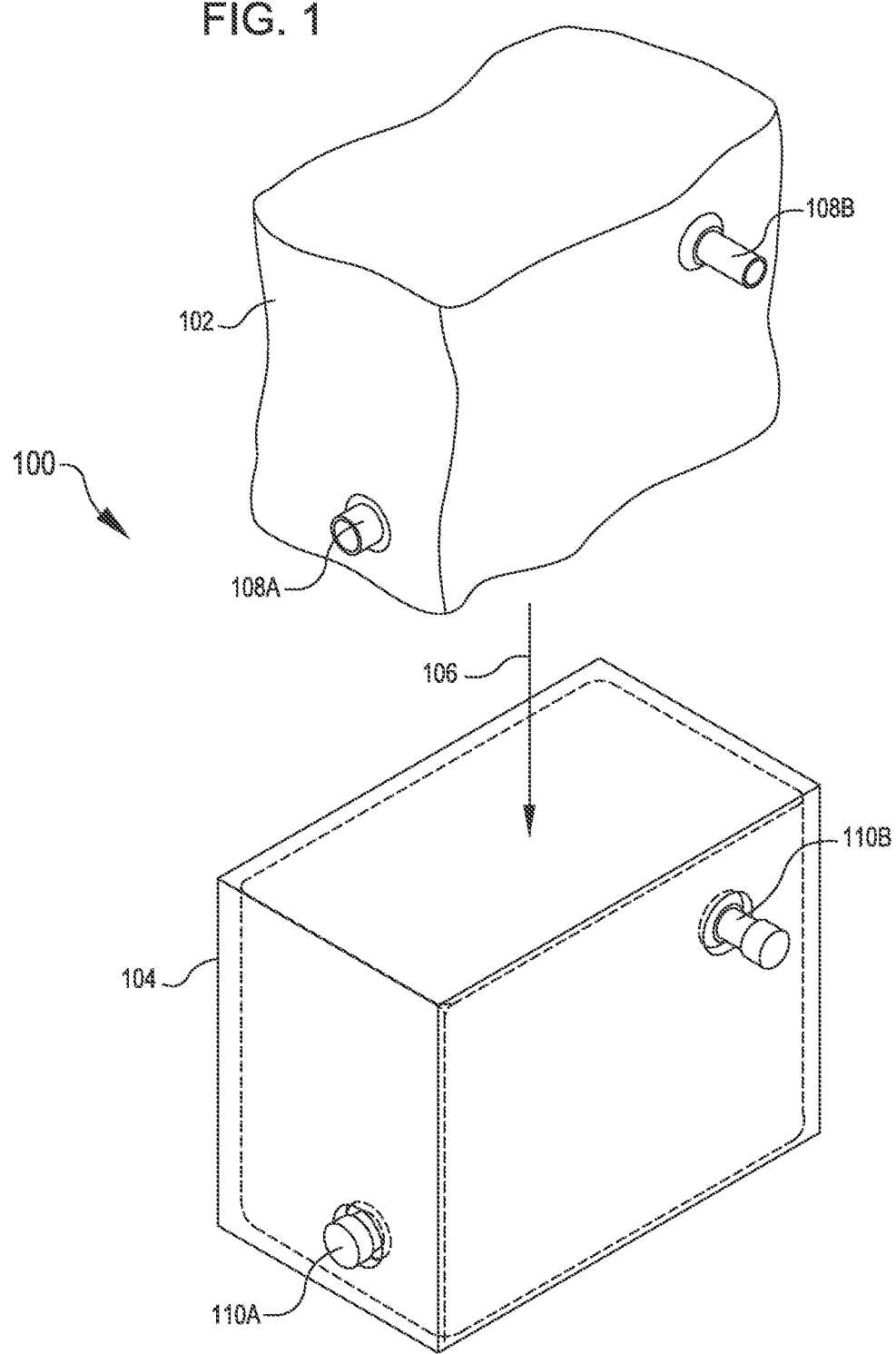
FIG. 1 shows an exploded assembly view of an aviation fuel tank assembly according to certain embodiments of the invention.

Referring now to the drawings, in which like reference numerals represent like parts throughout the several views, FIG. 1 shows an exploded assembly view of an aviation fuel tank assembly 100 having a rigid outer tank 104 and a flexible inner tank 102 according to certain embodiments. The flexible inner tank 102 can be installed (e.g., illustrated by arrow 106) within the rigid outer tank 104, such as to improve a crash resistance of the overall fuel tank assembly 100. Generally, the flexible inner tank 102 is aligned in—but not bonded to—the rigid outer tank 104 during installation (in part because government standards are typically only established for arrangements without bonding). Features 108A, 108B of the flexible inner tank 102 can be aligned with corresponding features 110A, 110B of the rigid outer tank 104 when the tank assembly 100 is assembled. For example, alignment of the corresponding features 108 and 110 may permit fuel to be introduced into and/or accessed from the fuel tank assembly 100.

The inner flexible tank 102 may be produced in any suitable manner, including known techniques. For example, the flexible inner tank may be made with a rubber-reinforced polyamide fabric (or polyester fabric) or any construction that will absorb energy (e.g., by distorting) in the event of a crash.

The outer rigid tank 104 can include a composite material formed from a resin matrix combined with a fiber reinforcement. In various embodiments, the resin matrix is a thermoplastic resin matrix, such as polyphenylsulfone (PPSU), polyetheretherketone (PEEK), or Polyetherketoneketone (PEKK). In some embodiments, the fiber reinforcement includes a textile with a particular weave pattern, such as a twill pattern. However, other variations (which may be more or less specific than these preliminary examples) will be appreciated from subsequent discussion herein. Various constructions of the outer rigid tank 104 described herein may provide crash resistance for the aviation fuel tank assembly 100. Accordingly, use of such constructions of the outer rigid tank 104 may allow the flexible inner tank 102 to be reduced in thickness (or altogether eliminated, e.g., in smaller tanks) while still providing a tank assembly 100 of comparable capacity that meets government crash standards.

Various constructions are suitable for the rigid outer tank 104. As a first example construction, FIG. 2 illustrates a side cross-sectional view of a monolithic structure 200 for use in a wall of the rigid outer tank 104 according to certain embodiments. The monolithic structure 200 includes resin matrix layers 220 and textile layers 222. In some aspects, the resin matrix layers 220 are formed of thermoplastic material; however, various options for the resin matrix layers 220 are described in greater detail below.

Generally, the monolithic structure 200 is formed by applying the resin matrix layers 220 (e.g., as a film) to the textile layers 222 and subjecting the resulting assembly to heat and pressure. The heat and pressure cause the resin matrix layers 220 to melt (or otherwise become pliable) and permeate the textile layers 222. The resin matrix layers 220 re-solidify during subsequent cooling and/or curing to form a composite material with the textile layers 222. In the completed composite material, the textile layers 222 are typically described as a reinforcement for the resin matrix layers 220. Although FIG. 2 shows four resin matrix layers 220 and three textile layers 222, the monolithic structure 200 can be formed by any number of such layers, (including as few as one each or as many as twenty or more). Additionally, the monolithic structure 200 can be formed by other techniques than the technique just described. For example, as may be particularly useful in embodiments with many layers, resin matrix layers 220 and the textile layers 222 can be combined into sub-assemblies that can be joined to one another (e.g., before, during, or after curing) by welding, weaving, stitching, intervening bonding material, or other joining mechanisms. In some such aspects (and in some other aspects), the resin matrix layers 220 and/or the textile layers 222 shown as individual layers in FIG. 2 may correspond to multiple such layers adjacent one another (e.g., as in cases where resin layers 222 that are respectively on top and bottom of adjacent sub-assemblies are placed in contact with one another when the sub-assemblies are stacked).

As a second example construction, FIG. 3 illustrates a side cross-sectional view of a sandwich structure 225 for use in a wall of the rigid outer tank 104 according to certain embodiments. The sandwich structure 225 includes skin layers 224 joined to either side of a core 226. The core 226 may be formed from a material that will provide low-weight reinforcement for the sandwich structure 225. Non-limiting examples of materials that are suitable for the core include foam and structural honey comb panels (such as may be commercially available as Nida Core®). The skin layers 224 include resin matrix layers 220 and textile layers 222 as described above with respect to FIG. 2. The skin layers 224 can be joined to the core 226 by any suitable joining mechanism, including welding and intervening bonding material. The core 226 may provide additional strength such that the resin matrix layers 220 and textile layers 222 can be smaller in thickness and/or fewer in number than a corresponding tank wall formed with a monolithic structure 200 that does not include a core 226.

In some aspects, the core 226 and a resin matrix layer 220 adjacent the core 226 both include components having a common chemical composition. In an illustrative example, the core 226 is formed of PPSU foam (e.g., Radel® R-1050 PPSU Foam commercially available from Solvay Advanced Polymers) and an adjacent resin matrix layer 220 is formed of PPSU (e.g., RADEL® R polyphenylsulfone commercially available from Solvay Advanced Polymers). Forming the core 226 and an adjacent resin matrix layer 220 of materials with components having a common chemical composition (such as PPSU) can make the core 226 and an adjacent resin matrix layer 220 easier to weld to one another when joining the skin layer 220 to the core 226.

In many embodiments, thermoplastic material can be used for a resin matrix layer 220 in a wall of a rigid outer tank 104 (such as in the monolithic structure 200 of FIG. 2 or the sandwich structure of FIG. 3). Thermoplastic materials have several characteristics that can be advantageous in construction of a rigid outer tank 104 of an aviation fuel tank assembly 100. For example, thermoplastic composite materials generally exhibit significant elongation before breaking (e.g., between 50 to 500% elongation, which is considerably more than the less than 10% elongation common for thermosetting composite materials). Without wishing to be bound by any particular theory, the present inventors accordingly believe that thermoplastic materials can absorb much more energy than thermosetting materials. Thus, it is believed that thermoplastic materials can provide a degree of crash resistance in a rigid outer tank 104 previously unrealized by the known use of thermosetting materials.

Additionally, in contrast to a thermosetting material (which irreversibly changes when cured), a thermoplastic resin matrix can typically be re-heated to become pliable. As such, using a thermoplastic resin matrix can increase an ease with which other features (such as handles, attachment features, interfaces, supports, etc.) can be welded or otherwise joined to the rigid outer tank 104.

The thermoplastic material for a resin matrix layer 220 can be selected from a wide variety of options. As non-limiting examples, suitable thermoplastic material may include materials that can be categorized among the following types (each followed by a non-exhaustive list of example compounds for that particular type):

Polyolefin types (e.g., polyethylene (PE), low-density polyethylene (LDPE), high-density polyethylene (HDPE), polypropylene (PP), polymethylpentene (PMP));

Styrenic types (e.g., polystyrene (PS), acrylonitrile butadiene styrene (ABS), styrene acrylonitrile (SAN));

Vinylic types (e.g., polyvinyl chloride (PVC), polyvinylidene chloride (PVDC));

Acrylic types (e.g., poly(methyl methacrylate) (PMMA));

Fluoropolymer types (e.g., perfluoroalkoxy (PFA), polyethylenetetrafluoroethylene (ETFE), fluorinated ethylene-propylene (FEP), chlorotrifluoroethylene (CTFE), EthyleneChloroTriFluoroEthylene (ECTFE), polytetrafluoroethylene (PTFE), polyvinylidene fluoride (PVDF), polyvinyl fluoride (PVF));

Polyester types (e.g., polyethylene terephthalate (PET), Polyethylene terephthalate glycol-modified (PETG), polybutylene terephthalate (PBT), liquid-crystal polymers (LCP));

Polyamide (PA) types (e.g., polycaprolactam (Pa 6), polyhexamethylene adipamide (Pa 6.6), polyamide 11 (Pa 11), polyamide 12 (Pa 12), aliphatic polyamide 4.6 (Pa 4.6), polyphthalamide (PPA), polyamide-imides (PAI));

Polyimide types (e.g., polyetherimide (PEI)), polyimide (PI));

Polyether types (e.g., polyoxymethylene (POM), polycarbonate (PC), polypropylene oxide (PPO), polyphenyl ether (PPE), Polyaryletherketone (PAEK), polyether ether ketone (PEEK), poly ether ketone ketone (PEKK), poly ether ketone ether ketone ketone (PEKEKK), poly-ether-ketone (PEK));

Sulfur-containing polymer types (e.g., polyphenylene sulfide (PPS), polysulfone (PSU), polyethersulfone (PES or PESU), polyphenylsulfone (PPSU), polyarylene sulfides (PAS)); and Otherwise unclassified thermoplastic polymers types (e.g., thermoplastic polyurethane (TPU), polylactic acid (PLA), ethylene vinyl alcohol (EVOH));

In some aspects, a particular thermoplastic polymer may be preferred for the thermoplastic resin matrix due to the thermal properties of the material. For example, polymers with a higher melting point (Tf) and/or softening point (Tg) may be preferred because they will keep rigidity and properties in a high ranges of temperature. Typically for crash worthy helicopter's fuel tanks, the range of service temperature will be from −55° C. up to +85° C. Additionally or alternatively, polymers with a higher fire resistance (e.g., PPSU, PEI, PEEK, PEKK) may be preferred, e.g., to provide increased safety and reduce a risk of fuel ignition in case of a fire aboard the aircraft or otherwise near the aviation fuel tank assembly 104. Accordingly, in some aspects, the following from the types listed above are preferred for the thermoplastic resin matrix due to their thermal properties: fluoropolymers, polyesters, polyamides, polyimides, polyethers and sulfur-containing polymers.

In some aspects, amorphous polymers are preferred for the thermoplastic resin matrix. Amorphous polymers generally exhibit better energy absorption than semi-crystalline polymers. Accordingly, amorphous polymers are believed to generally be more suited for crash energy absorption purposes than semi-crystalline polymers. A non-exhaustive list of amorphous materials from the examples listed above includes PEI, PPSU, and some polyether grades like Kepstan 6000 PEKK commercially available from ARKEMA.

On the other hand, amorphous polymers are generally less fluid-resistant than semi-crystalline polymers. Fluid-resistance is an important factor for consideration because the fuels (such as JET A1 fuel) that are typically stored by aviation fuel tank assemblies 100 often have a chemical composition that can degrade materials with a low fluid-resistance. Fluid-resistance is usually correlated to the particular chemical composition of a material. Polymers that contain sulfur generally exhibit suitable fluid resistance for use in aviation fuel tank assemblies 100. Accordingly, in some aspects polymers containing sulfur (e.g., PSU, PPSU, or PES or PESU) are preferred for the thermoplastic resin matrix.

In view of these considerations, in some aspects, PPSU is a preferred material for the thermoplastic resin matrix. PPSU has suitable thermal properties, is fire resistant, is amorphous, and has high fluid resistance among amorphous options. In a specific illustrative example, it is estimated that a fuel tank assembly 100 made with PPSU as the resin matrix layers 220 in the rigid outer tank 104 could be 20% or more lighter than a tank achieving a comparable crash resistance using a known thermosetting materials. In this specific illustrative example, the weight savings could be obtained due to: (A) a reduction of the weight of the inner flexible tank (for example polyamide or polyester fabrics could be replaced for example by lower weight textiles, e.g., materials with less energy absorption but more puncture resistance, such as 100% para-aramid (such as Kevlar, Twaron, technora, etc.) or Vectran); (B) by a reduction of the weight of components used for assembly of the tank (for example, weighty mechanical fasteners (such as screws) and/or glues could be reduced in quantity and/or eliminated altogether and replaced by thermo-stamping, welding, or other joining techniques that can be employed with thermoplastics without comparable addition of weight), or (C) some combination of these and/or other factors.

In an alternative embodiment, PEEK or PEKK are preferred thermoplastic materials for the resin matrix layers 220. Although PEEK is semi-crystalline instead of amorphous, PEEK has certain mechanical properties (e.g. tension resistance) that the present inventors have found to be advantageous for crash resistance applications. Furthermore, some specific grades of PEKK can be amorphous (e.g., Kepstan 6000 commercially available from ARKEMA).

Figure 4:
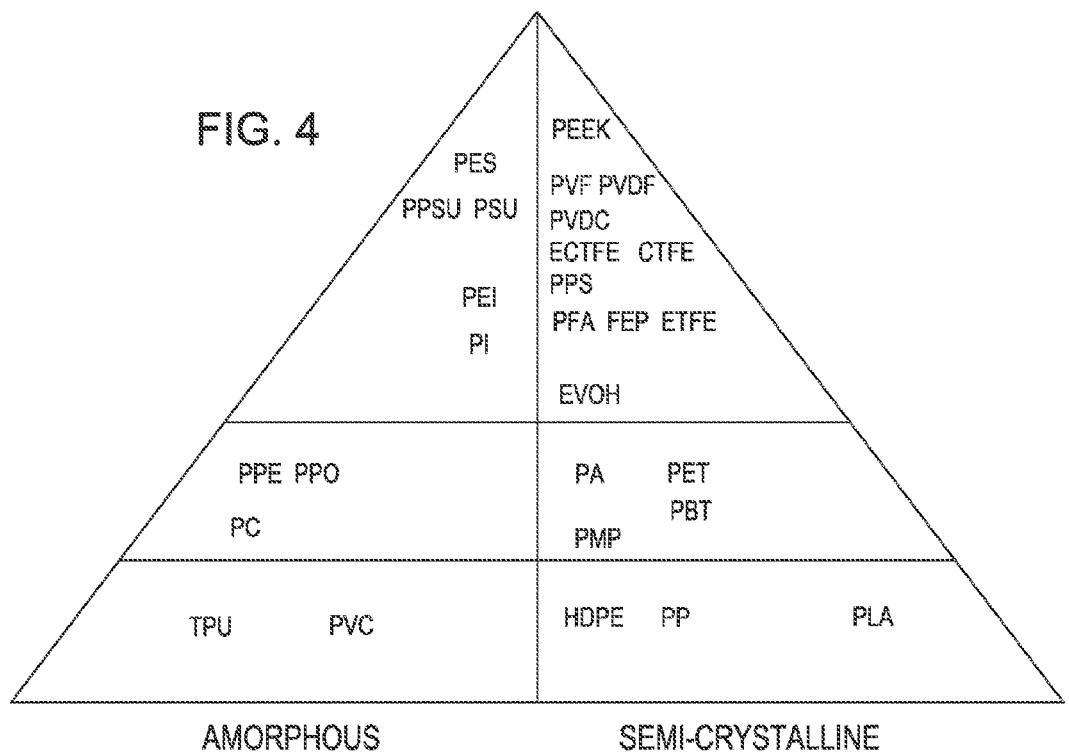
FIG. 4 is a diagram illustrating classification of various commercially available thermoplastic films that can be used in an aviation fuel tank assembly according to certain embodiments.
Figure 5:
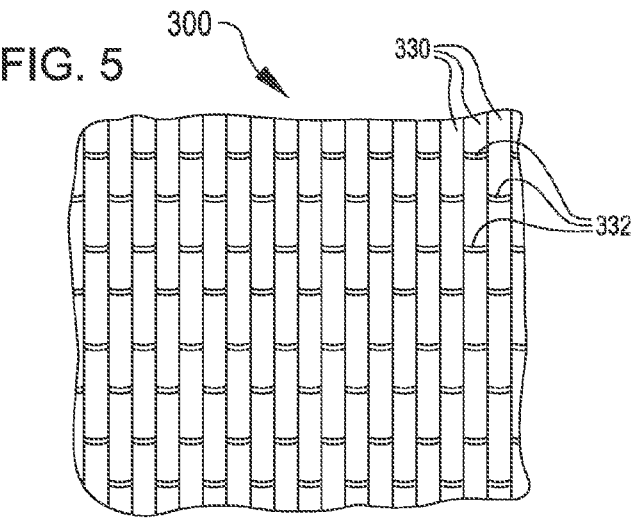
FIG. 5 illustrates an example of a unidirectional fabric that may be used in an aviation fuel tank assembly according to certain embodiments.

In some embodiments, the resin matrix layers 220 can be formed from films that are commercially available. For example, FIG. 4 is a diagram illustrating classification of various thermoplastic polymers that are typically commercially available in film form. FIG. 5 is illustrative in nature; hence, although various thermopolymers discussed above appear in the diagram, the diagram is not intended to be an exhaustive list. The left side of the diagram corresponds to films of thermopolymers that are amorphous, while the right side of the diagram corresponds to films of thermopolymers that are semi-crystalline. The bottom-most tier of the diagram corresponds to thermopolymers that are typically classified as "commodity" polymers, the middle tier corresponds to thermopolymers that are typically classified as "mid-grade," "middle class," or "engineering" polymers, and the top-most tier of the diagram corresponds to thermopolymers that are typically classified as "high performance" polymers. Typically, polymers in a higher tier are more expensive and are considered to have better characteristics (e.g., mechanical properties and thermal properties) than polymers in a lower tier.

Referring again collectively to FIGS. 1-3, many variations are possible for the textile layers 222 in a wall of a rigid outer tank 104 (such as in the monolithic structure 200 of FIG. 2 or the sandwich structure of FIG. 3). In many embodiments, each textile layer 222 represents a particular assembly of fibers. The assembly of fibers may be characterized according to structure of the fibers, composition of the fibers, and/or the arrangements of the fibers.

For example, in various aspects the fibers used in the textile layers 222 have a structure that is continuous, such as yarn with continuous filaments. In contrast to filaments in a spun yarn (which is typically made up of many short filaments twisted or otherwise combined together to from a combined overall length of a yarn that is much greater than any of the individual filaments), continuous filaments typically extend the full length between opposite ends of a yarn. The textile layers 222 can utilize continuous mono-filament yarns (e.g., yarns each having a single continuous filament extending along the length of yarn) or continuous multi-filament yarn (e.g., yarns each having multiple continuous filaments extending along the length of yarn). Some suitable continuous multi-filament yarn have continuous filaments that are twisted together, while other suitable continuous multi-filament yarn have continuous filaments that are not twisted together.

Various compositions of fibers can be suitable for the textile layers 222. As non-limiting examples, the textile layers 222 can be constructed of carbon fibers (e.g., HM or HS), para-aramid fibers (e.g., Kevlar, Twaron, Technora), meta-aramid fibers (e.g., Nomex, Kermel); aromatic polyester fibers (e.g., Vectran), glass fibers (e.g., S-Glass, E-Glass, or R-Glass), and/or PBO fibers (e.g., Zylon). As an additional non-limiting example, a fabric made of PE HT fibers (for example Dyneema UHMW) could be used effectively with a thermoplastic matrix having a low melting point (e.g., LDPE or HDPE). In some aspects, textile layers 222 that have carbon fibers are preferred. For example, carbon fibers may provide a high degree of strength for the textile layer 222 that is advantageous for crash resistance.

Various arrangements of fibers can be suitable for textile layers 222. In many aspects, the textile layers 222 include materials produced by weaving yarns relative to one another. The textile layers 222 may be arranged in what may be categorized as 1D, 2D, or 3D arrangements. Although the names of these categories can refer generally to the number of dimensions in which yarns are oriented or strength is exerted, these categories may be best understood with respect to the non-limiting examples within these categories that will now be discussed. However, these categories (and associated examples) are non-limiting illustrations only, and are not intended to be an exhaustive list.

Arrangements in the 1D category generally feature yarns that are oriented so that the resulting structure exhibits strength primarily in a single direction (e.g., parallel to a particular axis). As a non-limiting example, FIG. 5 illustrates an example of a unidirectional fabric 300 that may be used for a textile layer 222 in some aspects. Unidirectional fabrics are made of fibers running primarily in only one direction (e.g., as illustrated by the larger primary fibers 330 in FIG. 5), with zero to few fibers running in other directions (e.g., as illustrated by the smaller secondary fibers 332 in FIG. 5). For example, the unidirectional fabric 300 may include more than 75% (and in some cases more than 90%) of its weight in the primary fibers 330 that are oriented in the single direction.

Arrangements in the 2D category generally feature yarns that are oriented so that the resulting structure exhibits strength primarily in two directions or within a two-dimensional space (e.g., within a plane). Various woven configurations may be considered 2D arrangements. As a first non-limiting example of a 2D arrangement, FIG. 6 illustrates an example of a plain weave fabric 400 that may be used for a textile layer 222 in some aspects. The illustrated plain weave fabric 400 includes weft yarns 434 crossing the warp yarns 436 so that an individual weft yarn 434A is arranged in a repeating pattern of passing over one warp yarn 436A and then passing under a next, adjacent warp yarn 436B (and so on). Adjacent weft yarns 434A and 434B are shown crossing the warp yarns 436 in opposite ways (e.g., when the first weft yarn 434A passes over a particular warp yarn 438A, the adjacent second weft yarn 434B passes under the particular warp yarn 438A), giving the fabric a grid or checkerboard appearance. Other forms of plain weave fabrics can also be used, including basket weave plain weaves, in which two or more adjacent yarns are woven the same way in the warp direction or weft direction, or both directions. Additionally, some plain weaves have yarns that pass over two yarns then under two yarns or exhibit some other repeating pattern of alternating over and under a specific number of yarns (e.g., instead of the above-described one-under, one-over pattern).

As a second non-limiting example of a 2D arrangement, FIG. 7 illustrates an example of a satin weave fabric 500 that may be used for a textile layer 222 in some aspects. The illustrated satin weave fabric 500 includes weft yarns 538 crossing the warp yarns 540 so that an individual weft yarn 538A (1) is passed under one warp yarn 540A; (2) "floats" over (e.g., passes on one side instead of between) the next four adjacent warp yarns 540B, 540C, 540D, and 540E; and (3) is passed under an adjacent fifth warp yarn 540F. Such an arrangement may be referred to as "5H" satin (e.g., with the "5" referring to the sequential number of the warp yarn about which the weft yarn is next passed to cease floating). However, other satin weaves can also be used, including 4H, 6H, or more than 6H weaves. Adjacent weft yarns 538A and 538B shown in FIG. 7 are initially passed under different weft yarns 540A and 540 C, which can spread out the positions at which warp yarns are over weft yarns and cause the satin weave fabric 500 to have a smoother surface finish. Additionally, some satin weaves include warp yarns floated relative to weft yarns instead of the above-described weft yarns floating relative to warp yarns. Furthermore, some satin weaves have yarns that pass over and float under instead of the above-described passing under and floating over.

Figure 8:
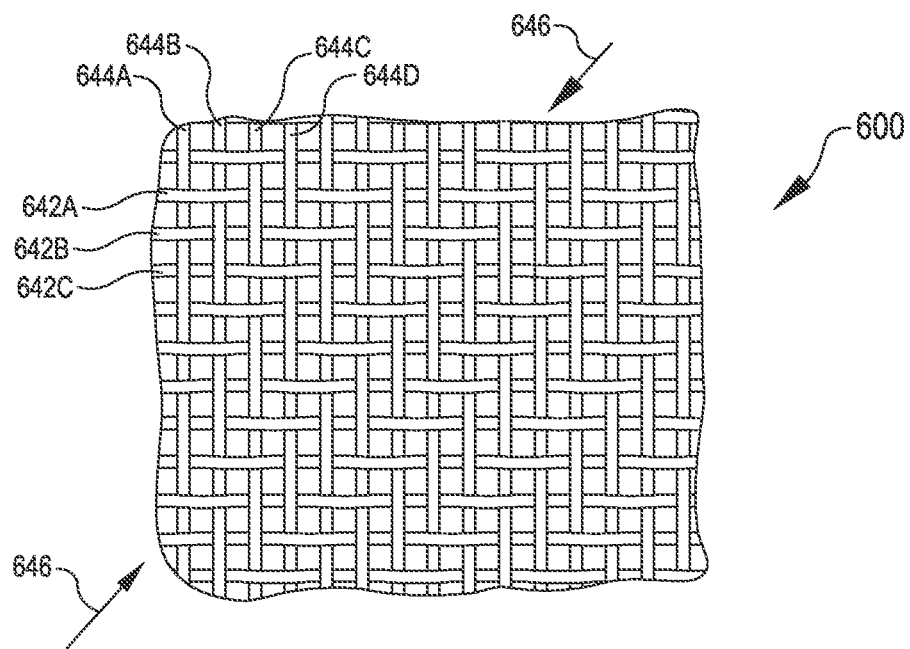
FIG. 8 illustrates an example of a twill fabric that may be used in an aviation fuel tank assembly according to certain embodiments.

As a third non-limiting example of a 2D arrangement, FIG. 8 illustrates an example of a twill weave fabric 600 that may be used for a textile layer 222 in some aspects. The illustrated twill weave fabric 600 includes weft yarns 642 crossing warp yarns 644. A first individual weft yarn 642A is arranged in a repeating pattern of passing over two warp yarns 644A and 644B and passing under the following two warp yarns 644C and 644D. An adjacent second individual weft yarn 642B is likewise arranged in a repeating "two-over, two-under" pattern, but the pattern of the second weft yarn 642B is offset to the left (e.g., by one yarn) from the pattern of the first weft yarn 642A. For example, in the drawing, the first weft yarn 642A passes under the third warp yarn 644C and the fourth warp yarn 644D, but the second weft yarn 642B instead passes under the second warp yarn 644B and the third warp yarn 644C. A third weft yarn 642C likewise has the recurring "two-over, two-under" pattern offset to the left from the pattern of the second weft yarn 642B (e.g., such that the third weft yarn 642C is shown passing under the first warp yarn 644A and the second warp yarn 644B instead of passing under the second warp yarn 644B and the third warp yarn 644C like the second weft yarn 642B). This arrangement can give the twill weave fabric 600 an appearance of having diagonal bars (e.g., as may be appreciated with reference to the weft yarns 642 that are positioned over the warp yarns 644 between the arrows 646 in FIG. 8). The illustrated arrangement of the twill weave fabric 600 can be termed a "2/2" twill, with the numerator referring to the "two-over" and the denominator referring to the "two-under" of the pattern. Other forms of twill weave fabrics can also be used, including arrangements with other repeating patterns (e.g., 2/1, 1/2, 3/1), arrangements with other offsets (e.g., two or more yarns and/or to the right instead of the left), and/or arrangements in which the pattern and/or offset is characterized with respect to the warp direction instead of the weft direction. In various embodiments, twill is a preferred configuration for a textile layer 222 used in reinforcing a resin matrix layer 220 of thermoplastic material. However, it may also be appreciated that twill and other configurations of textile layers 222 described herein are not limited solely to resin matrix layers 220 that include thermoplastic material. As a specific illustrative example, a crash resistant aviation fuel tank assembly 100 according to some aspects may include a rigid tank 104 formed with a composite material in which at least one textile layer 222 has a twill configuration and reinforces at least one resin matrix layer 220 of thermosetting material.

Arrangements in the 3D category generally feature yarns that are oriented so that the resulting structure exhibits strength in more than two directions (e.g., within a three-dimensional space or resisting forces that are aligned within a plane in addition to forces that are not aligned within the plane). Some examples of 3D arrangements are described in U.S. patent application Ser. No. 13/930,054, titled "Hybrid tank wall for high performance crash resistant tanks," filed Jun. 28, 2013, which claims the benefit of U.S. Provisional Application Ser. No. 61/665,948, filed Jun. 29, 2012, titled "Hybrid Tank Wall for High Performance Crash Resistant Tanks," the entire contents of which are hereby incorporated by reference. Some descriptions of such arrangements are substantially reproduced herein.

Figure 9:
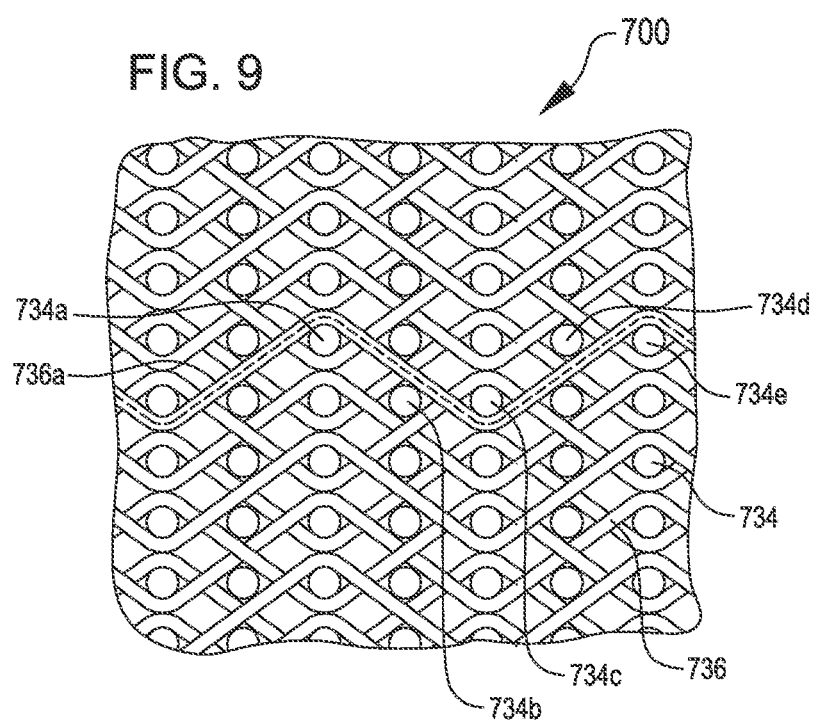
FIG. 9 illustrates an example of an interlock fabric that may be used in an aviation fuel tank assembly according to certain embodiments.

As a first non-limiting example of a 3D arrangement, FIG. 9 illustrates an example of an interlock weave fabric 700 that may be used for a textile layer 222 in some aspects. The interlock weave fabric 700 features an interlock structure or configuration. In this configuration, different layers of textiles are woven together. For example, the different layers of textiles may correspond to textile layers 222 having any of the structures discussed elsewhere herein (e.g., unidirectional, plain weave, twill weave, or satin weave) and/or may correspond to various textile layers 222 of a monolithic structure 200 or sandwich structure 225. The round elements 734 in FIG. 9 illustrate the weft textile, and elongated textiles 736 illustrate the warp. As shown, a first warp direction textile 736a wraps around a first weft direction textile 734a and extends diagonally down at an angle past a second weft textile 734b in a lower row, and continues to extend down diagonally around a third weft textile 734c, wraps around that textile and extends diagonally back up past a fourth weft textile 734d, and wraps around a fifth weft textile 734e, and extends back down to begin the configuration again. Although one configuration of the warp textile has been shown, it should be understood that any other options are possible and within the scope of this invention. For example, the warp textile may extend down past one, two, three, five, ten, or any number of weft textiles.

As a second non-limiting example of a 3D arrangement, FIG. 10 shows an example of another interlock weave fabric 800 that may be used for a textile layer 222 in some aspects. In FIG. 10, the round elements 838 illustrate the weft textile, and elongated textiles 840 illustrate the warp. As shown, a first warp direction textile 840a wraps around a first weft textile 838a and extends diagonally down at an angle past four weft textiles 838b, 838c, 838d, and 838e, and then wraps around than adjacent weft textile 838f, then extends diagonally back up past four more weft textiles 838g, 838h, 838i, 838j and wraps around an adjacent weft textile 838k, and extends back down to begin the configuration again. Further configuration of the weft and warp textiles are possible and within the scope of this invention.

As a third non-limiting example of a 3D arrangement, FIG. 11 shows an example of velvet weave fabric 900 that may be used for a textile layer 222 in some aspects. In FIG. 11, a warp direction textile 942 creates a heart-shaped configuration as it navigates around the weft direction textiles 944, weaving in and out and up and down in the directions as shown.

Other 3D arrangements can also be used. For example, 3D arrangements may be constructed by other weaving, knitting, and/or multi-layers textiles sewing. As another example, in some aspects, different layers of textiles may be oriented at different orientations. These are non-limiting examples only, and this list is not intended to be exhaustive. Other methods of arranging fibers relative to thermoplastic or other resins are also possible, including, but not limited to, filament winding arrangements. For example, yarn powdered with thermoplastic—or yarn mixed with thermoplastic yarns (e.g., carbon yarns mixed with polyamide yarns)—may be wound about a mold or form and then melted in order to form a tank with a suitable fiber-reinforced thermoplastic structure. Furthermore, any of the above arrangements may be used alone or in various combinations with other arrangements described herein.

Although embodiments described herein are have been described with specific reference to aviation fuel tanks (e.g., crash-worthy helicopter fuel tanks), embodiments described herein may be used for other kind of fluid (liquid or gas) transportation or storage tanks Non-limiting examples of other uses include but are not limited to aeronautical systems (aircrafts, airplanes, helicopters, fighter jets, shuttles), marine systems (boats, personal watercraft), trucks, armored vehicles or cars, or any transportation applications that may need impact/crash resistance for tanks Any tank wall structure may also have additional layers, including but not limited to a vapor barrier to decrease the permeability (e.g., to decrease fuel permeability, for example), and conductive inner layer to achieve dissipation of electrostatic charges when needed (for example, for fuel transportation or storage) or a coating on the outer side of the wall, or a paint layer. Although certain of such layers are generally formed as part of the flexible inner tank, in some cases, one or more of these layers may be part of the rigid outer tank. For example, in an embodiment in which the inner flexible tank is eliminated, the vapor barrier layer may be formed as a film (e.g., from fluoropolymers films or polyamide films) positioned on an inner side (e.g., which may be in contact with fuel) of the rigid outer tank. Embodiments of the invention find particular use for a helicopter crash resistant fuel tank, but it should be understood that they may be used for other tank walls as well.

In summary and to provide additional detail, for certain embodiments, the aviation fuel tank assemblies described herein are designed to resist high mechanical stress and exhibit puncture resistance required for a crash-resistant tank wall according to CS27.963 and CS29.963 (e.g., puncture resistance>370 pounds=168 daN). Additionally or alternatively, an aviation fuel tank assembly made according to one or more of the features described may allow sufficient energy dissipation to comply with crash resistance standards according to the drop test required for a crash-worthy helicopter fuel tank according to CS27.952 and CS29.952, (e.g., 50 foot height=15 meters) or according to MIL-T-27422 §4.5.8.2 (e.g., 65 foot height=20 meters). Furthermore, aviation fuel tank assemblies made according to one or more of the features described may exhibit sufficient energy absorption to satisfy the dynamometer tear resistance test according to MIL-DTL- 27422 §4.5.1, the impact penetration test according to MIL-DTL-27422 §4.5.2, and/or the impact tear test according to MIL-DTL-27422 §4.5.3.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An aviation fuel tank assembly comprising:
a rigid wall, the rigid wall configured for energy absorption during a crash and comprising a composite material formed from a thermoplastic resin matrix reinforced by a textile, the textile comprising continuous filament yarn.

2. The aviation fuel tank assembly of claim 1, wherein the thermoplastic resin matrix comprises an amorphous thermoplastic.

3. The aviation fuel tank assembly of claim 1, wherein the thermoplastic resin matrix comprises a thermoplastic containing sulfur.

4. The aviation fuel tank assembly of claim 1, wherein the thermoplastic resin matrix comprises an amorphous thermoplastic containing sulfur.

5. The aviation fuel tank assembly of claim 1, wherein the thermoplastic resin matrix comprises PPSU.

6. The aviation fuel tank assembly of claim 1, wherein the thermoplastic resin matrix comprises PEEK or PEKK.

7. The aviation fuel tank assembly of claim 1, wherein the textile comprises a unidirectional fabric.

8. The aviation fuel tank assembly of claim 1, wherein the textile comprises a woven fabric.

9. The aviation fuel tank assembly of claim 1, wherein the textile comprises fabric having a plain weave.

10. The aviation fuel tank assembly of claim 1, wherein the textile comprises fabric having a satin weave.

11. The aviation fuel tank assembly of claim 1, wherein the textile comprises a fabric having a twill weave.

12. The aviation fuel tank assembly of claim 1, wherein the textile comprises a fabric having an interlock weave.

13. The aviation fuel tank assembly of claim 1, wherein the textile comprises a fabric having a velvet weave.

14. The aviation fuel tank assembly of claim 1, wherein the continuous filament yarn comprises continuous filament aramid yarns.

15. The aviation fuel tank assembly of claim 1, wherein the continuous filament yarn comprises continuous filament aromatic polyester yarns.

16. The aviation fuel tank assembly of claim 1, wherein the continuous filament yarn comprises continuous filament glass yarns.

17. The aviation fuel tank assembly of claim 1, wherein the continuous filament yarn comprises continuous filament PE HT yarns.

18. The aviation fuel tank assembly of claim 1, wherein the continuous filament yarn comprises continuous filament Zylon yarns.

19. The aviation fuel tank assembly of claim 1, wherein the continuous filament yarn comprises continuous filament carbon yarns.

20. The aviation fuel tank assembly of claim 19, wherein the textile comprises a fabric having a twill weave.

21. An aviation fuel tank assembly comprising:
a rigid wall, the rigid wall configured for energy absorption during a crash and comprising a composite material formed from a resin matrix reinforced by a textile, the textile comprising continuous filament yarn arranged in a twill weave.

22. The aviation fuel tank assembly of claim 21, wherein the resin matrix comprises a thermoplastic resin matrix.

23. The aviation fuel tank assembly of claim 21, wherein the resin matrix comprises an amorphous thermoplastic resin matrix.

24. The aviation fuel tank assembly of claim 21, wherein the continuous filament yarn comprises at least one of continuous filament carbon yarns, continuous filament aramid yarns, continuous filament aromatic polyester yarns, continuous filament glass yarns, continuous filament PE HT yarns, or continuous filament Zylon yarns.

25. The aviation fuel tank assembly of claim 21, wherein the continuous filament yarn comprises continuous filament aramid yarns.

26. The aviation fuel tank assembly of claim 21, wherein the continuous filament yarn comprises continuous filament aromatic polyester yarns.

27. The aviation fuel tank assembly of claim 21, wherein the continuous filament yarn comprises continuous filament glass yarns.

28. The aviation fuel tank assembly of claim 21, wherein the continuous filament yarn comprises continuous filament PE HT yarns.

29. The aviation fuel tank assembly of claim 21, wherein the continuous filament yarn comprises continuous filament carbon yarns.

30. The aviation fuel tank assembly of claim 21, wherein the continuous filament yarn comprises continuous filament Zylon yarns.

31. The aviation fuel tank assembly of claim 30, wherein the resin matrix comprises at least one of PPSU or PEEK or PEKK.

* * * * *